(12) United States Patent
Oddo et al.

(10) Patent No.: US 9,313,106 B2
(45) Date of Patent: Apr. 12, 2016

(54) METHOD AND APPARATUS FOR POPULATING AD LANDING SPOTS

(75) Inventors: Anthony Oddo, Boston, MA (US); Michael Bramlage, New York, NY (US); Maggie Nelson, Hastings on Hudson, NY (US)

(73) Assignee: NOKIA TECHNOLOGIES OY, Espoo (FI)

(*) Notice: Subject to any disclaimer, the term of this patent is extended or adjusted under 35 U.S.C. 154(b) by 495 days.

(21) Appl. No.: 13/582,805

(22) PCT Filed: Feb. 14, 2011

(86) PCT No.: PCT/FI2011/050133
§ 371 (c)(1),
(2), (4) Date: Dec. 4, 2012

(87) PCT Pub. No.: WO2011/113993
PCT Pub. Date: Sep. 22, 2011

(65) Prior Publication Data
US 2013/0138790 A1    May 30, 2013

Related U.S. Application Data

(60) Provisional application No. 61/315,725, filed on Mar. 19, 2010.

(51) Int. Cl.
*G06F 13/00* (2006.01)
*H04L 12/24* (2006.01)
(Continued)

(52) U.S. Cl.
CPC .......... *H04L 41/50* (2013.01); *G06Q 30/0251* (2013.01); *G06Q 30/0601* (2013.01)

(58) Field of Classification Search
CPC . H04L 41/0213; H04L 29/0872; H04L 29/06; H04L 41/22; H04L 41/12; H04L 41/50; G06Q 30/0251; G06Q 30/0601
USPC ........................................................ 709/223
See application file for complete search history.

(56) References Cited

U.S. PATENT DOCUMENTS 6,934,697 B1   8/2005 Warren
7,496,831 B2   2/2009 Dutta et al.
(Continued)

FOREIGN PATENT DOCUMENTS

| CN | 1759362 A | 4/2006 |
| CN | 101048793 A | 10/2007 |
| EP | 2068251 A2 | 6/2009 |

OTHER PUBLICATIONS

International Search Report and Written Opinion received for corresponding International Patent Application No. PCT/FI2011/050133, dated Jul. 5, 2011, 13 pages.
(Continued)

*Primary Examiner* — Robert B Harrell
(74) *Attorney, Agent, or Firm* — Ditthavong & Steiner, P.C.

(57) ABSTRACT

An approach is presented for providing automatic and manual rule setting rule setting by online service providers. A content programming platform receives a first input for defining one or more automatic rules for a plurality of landing spots in a content repository, the content programming platform will further receive a second input for defining at least one override rule for at least one of the landing spots, the at least one override rule superseding the automatic rule corresponding to the at least one landing spot. Based, at least in part, on the entries the landing spots are populated with respective content items.

23 Claims, 12 Drawing Sheets

(51) Int. Cl.
*G06Q 30/02* (2012.01)
*G06Q 30/06* (2012.01)

(56) References Cited

U.S. PATENT DOCUMENTS

| 8,276,086 | B2 | 9/2012 | Malden et al. |
| 2002/0112035 | A1 | 8/2002 | Carey et al. |
| 2003/0023698 | A1 | 1/2003 | Dieberger et al. |
| 2005/0216335 | A1 | 9/2005 | Fikes et al. |
| 2006/0129978 | A1 | 6/2006 | Abrari et al. |
| 2007/0156520 | A1 | 7/2007 | Sharma |
| 2007/0244748 | A1 | 10/2007 | Smith et al. |
| 2007/0261088 | A1 | 11/2007 | Phillips et al. |
| 2010/0042935 | A1 | 2/2010 | Malden et al. |

OTHER PUBLICATIONS

Chinese Office Action for related Chinese Patent Application No. 201180014658.2 dated Mar. 19, 2015, with English-language summary, 13 pages.

Office Action for corresponding Chinese Patent Application No. 201180014658.2, dated Nov. 25, 2015, with English-language summary, 12 Pages.

METHOD AND APPARATUS FOR POPULATING AD LANDING SPOTS

RELATED APPLICATION

This application was originally filed as PCT Application No. PCT/FI2011/050133 filed Feb. 14, 2011 which claims priority benefit to U.S. Provisional Patent Application No. 61/315,725, filed Mar. 19, 2010.

BACKGROUND

Network service providers and device manufacturers are continually challenged to deliver value and convenience to consumers by, for example, providing compelling network services. One of the network features that are recently gaining increasing attention is providing online services or content (e.g. applications, games, media, etc.) via an online store or repository. In order to increase the number of hits for suggested services, the online service providers need to suggest relevant services for every category of users based on various factors such as user interests (past experience), type and capabilities of user equipment, geographical location, etc. The factors involved in decision making may be global (e.g., applied to all user equipments), local (e.g., applied to certain groups of user equipment or at specific regions or locations) or individual (e.g., specifically set by the user of an equipment). Manual creation of all the possible combinations of these factors for producing a relevant front page of service suggestions for each group of users is a difficult and time consuming task. On the other hand if the task is completely automated, the required level of control to meet the needs of specific groups of users may not be achieved.

SOME EXAMPLE EMBODIMENTS

Therefore, there is a need for a hybrid approach of automated and manual processing for rules for determining the presentation of content items in an online store.

According to one embodiment, a method comprises receiving a first input for defining one or more automatic rules for a plurality of landing spots in a content repository, the automatic rules defining one or more content items for presentation in the respective landing spot. The method also comprises receiving a second input for defining at least one override rule for at least one of the landing spots, the at least one override rule superseding the automatic rule corresponding to the at least one landing spot. The method further comprises causing, at least in part, application of the automatic rules and the at least one override rule to populate the landing spots with respective content items.

According to another embodiment, an apparatus comprising at least one processor, and at least one memory including computer program code, the at least one memory and the computer program code configured to, with the at least one processor, cause, at least in part, the apparatus to receive a first input for defining one or more automatic rules for a plurality of landing spots in a content repository, the automatic rules defining one or more content items for presentation in the respective landing spot. The apparatus is also caused to receive a second input for defining at least one override rule for at least one of the landing spots, the at least one override rule superseding the automatic rule corresponding to the at least one landing spot. The apparatus is further caused to cause, at least in part, application of the automatic rules and the at least one override rule to populate the landing spots with respective content items.

According to another embodiment, a computer-readable storage medium carrying one or more sequences of one or more instructions which, when executed by one or more processors, cause, at least in part, an apparatus to receive a first input for defining one or more automatic rules for a plurality of landing spots in a content repository, the automatic rules defining one or more content items for presentation in the respective landing spot. The apparatus is also caused to receive a second input for defining at least one override rule for at least one of the landing spots, the at least one override rule superseding the automatic rule corresponding to the at least one landing spot. The apparatus is further caused to cause, at least in part, application of the automatic rules and the at least one override rule to populate the landing spots with respective content items.

According to another embodiment, an apparatus comprises means for receiving a first input for defining one or more automatic rules for a plurality of landing spots in a content repository, the automatic rules defining one or more content items for presentation in the respective landing spot. The apparatus also comprises means for receiving a second input for defining at least one override rule for at least one of the landing spots, the at least one override rule superseding the automatic rule corresponding to the at least one landing spot. The apparatus further comprises means for causing, at least in part, application of the automatic rules and the at least one override rule to populate the landing spots with respective content items.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing a hybrid approach for rule setting by online service providers are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "hybrid approach" refers to an approach for setting rules for the way services or contents appear on a landing page of a user equipment, wherein the hybrid approach is a combination of automated and manual setups. Although various embodiments are described with respect to the hybrid approach, it is contemplated that the approach described herein may be referred to with other descriptions.

Figure 1:
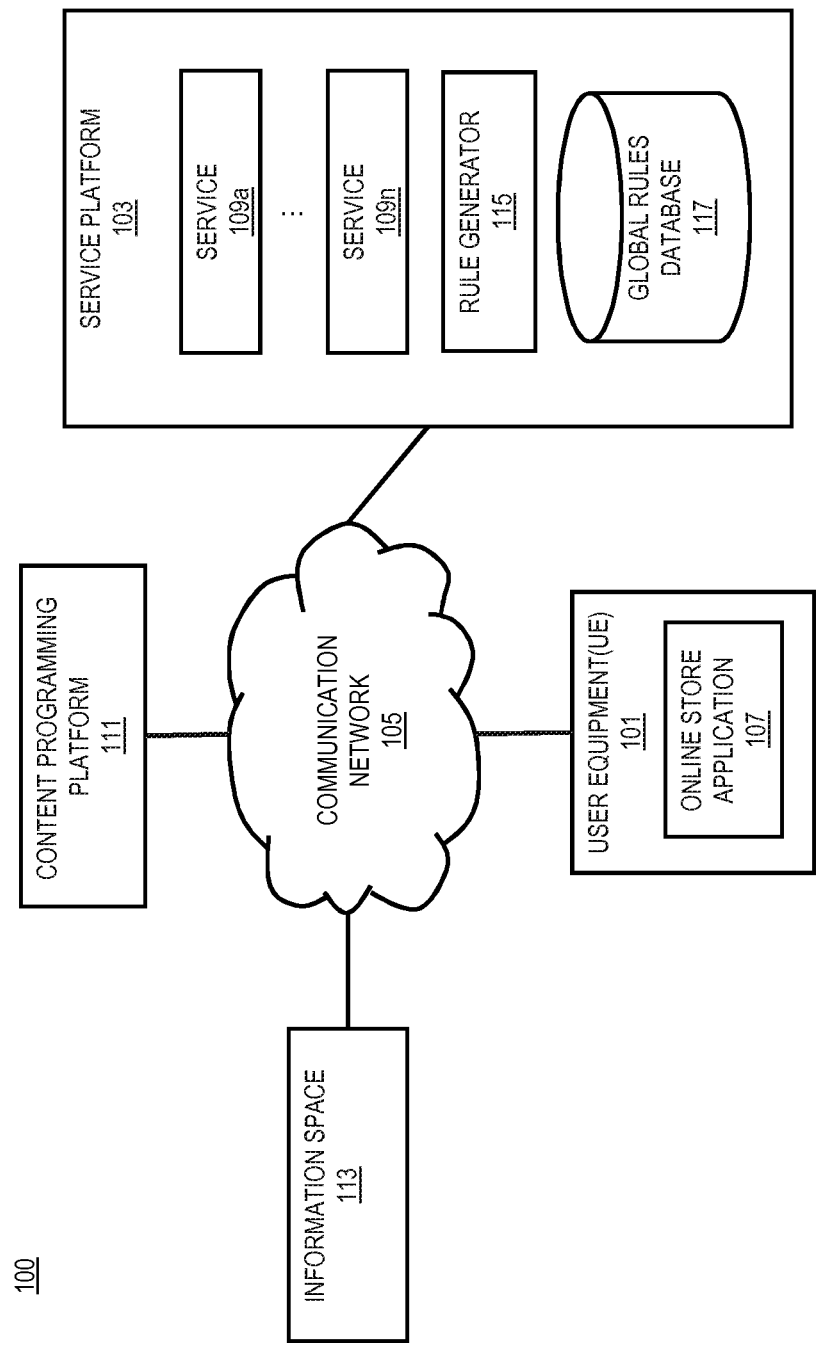
FIG. 1 is a diagram of a system capable of providing a hybrid approach for rule setting by online service providers, according to one embodiment.

FIG. 1 is a diagram of a system capable of providing a hybrid approach for rule setting by online service providers, according to one embodiment. As noted previously, online service providers often have a need to be able to provide the most relevant combination of suggested services or content in, for instance, a landing page of an online store (e.g., Nokia's OVI store). Generally, the landing page appears on an equipment display unit when a potential customer enters or accesses the online store (e.g.). However, service providers and device manufacturers face significant technical challenges to ensuring that such landing pages present content that is appropriate for a particular region, device, network operation, etc. For example, an application may be compatible only with user equipment with certain characteristics or may have a requirement for certain hardware capabilities such as memory or storage space, processing power, etc. On the other hand, some services may require users to have access authorization. Some other services may have access limitations in certain countries or territories while it may not be the case in some other localities.

In other words, one of the challenges in setting rules for appearance of service content on the user equipments' landing pages is the fact that there are many different factors involved such as user preferences, past history, device characteristics and capabilities, local restrictions, etc. Accordingly, there can be thousands of combinations of these factors, which in turn can result in potentially thousands of different landing pages that need to be populated with appealing content for the users. A manual process for defining the different content or combinations of content for each of the thousands of different landing pages can be extremely resource and manpower intensive. However, if the process is completely automated, the control required for meeting specific needs of service producers and service users would not be achieved.

To address this problem, a system 100 of FIG. 1 introduces the capability of providing a hybrid approach for rule setting by online service providers. More specifically, the system 100 presents a hybrid approach to content programming of an online store that operates between the two extremes of manually intensive and completely automated setups. In one embodiment, this hybrid approach enables the definition of a set of rules for automatically specifying content in the landing page of an online store while providing a tool for overriding or fine tuning the automatic determinations. In this way, the system 100 enables service providers, content providers, publishers, and the like to manually tailor the content programming that is automatically determined (e.g., via automatic rules). In certain embodiments, the automatic rules and/or the rules that override the automatic rule can be specified or applied at global level (e.g., affecting all landing pages of the online store), local level (e.g., affecting landing pages meeting one or more criteria such as location, device, operator, etc.), or a combination thereof. This capability, for instance, enables the service providers to direct product promotions in the online store at specific countries, regions, devices, operators, etc.

In one embodiment, the content programming process may cause rules or filters for determining content programming to be stored (e.g. in the form of RDF graphs). The stored rules or filters may be accessed and used by the processing components of the content programming platform. The service platform administrators may then preview the rule or filter behavior, by seeing how the landing pages of the online store may be presented, before approving the rules or filters to go live.

By way of example, one way of controlling the content of a landing page on a user equipment is via a set of filters that are defined for each of the available landing spots in the structure of the online store landing page. These filters control how content is selected to appear on the page based on criteria such as recent activity, price, category, etc. It is noted that content priorities may also differ for different devices, countries, regions, languages, etc. They may also differ according to user's specific needs. Moreover, the rules or filters can be edited periodically based on current promotions, user interest, etc.

In one embodiment, filters may be generated and stored using Resource Description Framework (RDF) format. RDF is a family of World Wide Web Consortium (W3C) specifications originally designed as a metadata data model. It has come to be used as a general method for conceptual description or modeling of information that is implemented in web resources; using a variety of syntax formats. The underlying structure of any expression in RDF is a collection of triples, each consisting of three disjoint sets of nodes including a subject, a predicate and an object. A subject is an RDF URI reference (U) or a Blank Node (B), a predicate is an RDF URI reference (U), and an object is an RDF URI reference (U), a literal (L) or a Blank Node (B). A set of such triples is called an RDF graph.

TABLE 1

| Subject | Predicate | Object |
| --- | --- | --- |
| uri://.../rule#CD-introduction, | rdf:type, | uri://.../Rule |
| uri://.../rule#CD-introduction, | uri://.../rule#assumption, | "c" |

The results of filtering may be accessible via an information space (e.g., a smart space) so that the front page of the online store does not need to directly access a programming tool in order to obtain filtered content. By way of example, information spaces are extensions of the "Giant Global Graph" in which one can apply semantics and reasoning at a local level. Each information space entity can be considered as an aggregated information set from different sources. This multi-sourcing offers considerable flexibility by enabling the same piece of information to come from different sources. Furthermore, in an information space, information requested by a user may be distributed over several information sets, and therefore in order to deduce an accurate answer to a request, the information from different sources are extracted and combined. Availability of the filtered content via an information space enables various components of the system, including user interfaces, to directly access the content.

As shown in FIG. 1, the system 100 comprises a user equipment (UE) 101 having connectivity to a service platform 103 and a content programming platform 111 via a communication network 105.

In one embodiment, the service platform 103 comprises information regarding available services 109a-109n. The information may include service requirements, restrictions, priorities, licensing information etc. The rule generator 115 accesses service related information and produces setup rules for landing pages. The rules are then stored in the global rules database 117. The global rules database 117 may be stored in the information space 113 so that it can be accessed by the content programming platform 111 directly without having to communicate with the service platform 103.

In one embodiment, the content programming platform 111 manages the set up process for landing pages for the UEs 101. For example, the content programming platform 111 fetches the global rules which in fact are service related rules from the service platform 103, the information space 113, or any other storage unit having connectivity with via the network 105. The content programming platform 111 enables the system administrator to define various rules or filters by providing interfaces to the administrator. The content programming platform 111 also enables the administrator to apply the overriding filters (e.g., local rules or filters) on the global rules in order to tailor the global rules to the specific needs of each group of user equipments based on factors such as local restrictions, device configuration, user preferences, etc.

Following the filtering of rules, the rules are applied on services 109a-109n and the services are aggregated into combinations of sets of services based on the applied rules to be presented to each group of user equipments. The aggregated sets of services are presented to the UEs 101.

In one embodiment, the respective online store application 107 of each UE 101 receives the aggregated set of services and displays the services on the landing page of the UE 101 for the user to select from. The online store application 107 may also collect data on user behavior regarding the selection of services. The collected data can be transferred to the content programming platform 111 to be used for filter modification or manual modification of the rules to be used in subsequent decision makings on the content of landing page for the specific user equipment.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.).

By way of example, the UE 101, and the content programming platform 111 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2A:
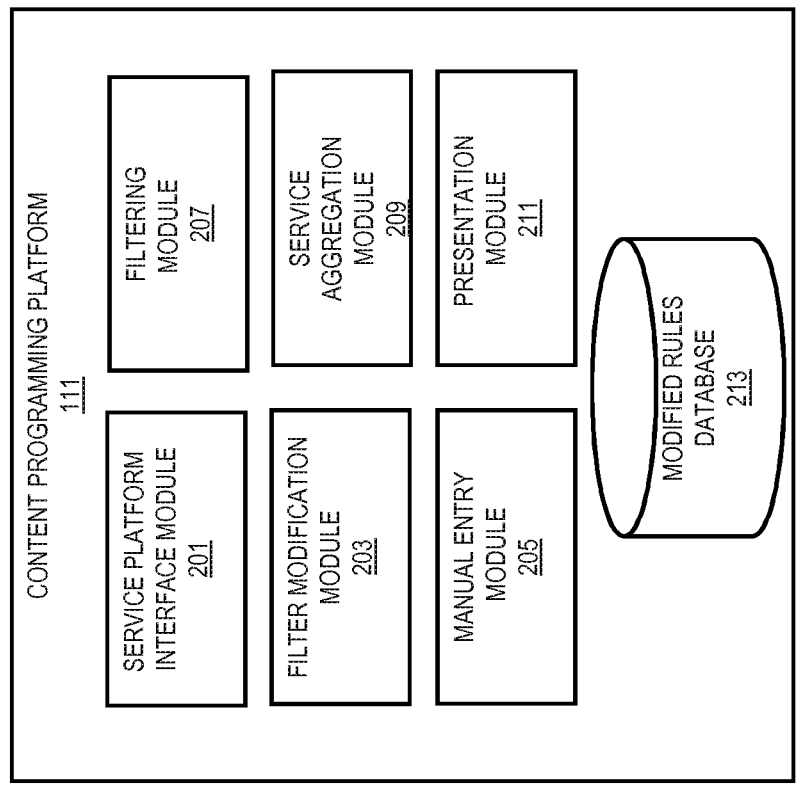
FIG. 2A is a diagram of the components of a content programming platform, according to one embodiment.

FIG. 2A is a diagram of the components of a content programming platform, according to one embodiment. By way of example, the content programming platform 111 includes one or more components for providing a hybrid approach for rule setting by online service providers. It is contemplated that the functions of these components may be combined in one or more components or performed by other components of equivalent functionality. In this embodiment, the content programming platform 111 includes a service platform interface module 201, a filter modification module 203, a manual entry module 205, a filtering module 207, a service aggregation module 209, a presentation module 211, and a modified rules database 213. The content programming platform 111 has connectivity with the service platform 103 and the user equipments 101 via the communication network 105.

In one embodiment, the service platform interface module 201 communicates with the service platform 103 to obtain global rules 117 which will be used as a basic set of rules for automatically determining the content to be presented in the landing page of an online store (e.g., service platform 103). The global rules database 117 may include rules specific to each service 109 such as, service category (e.g., game, music, video, etc.), pricing, hardware and software requirements, licensing regulations, etc. The service platform interface 201 may create a local copy of the rules database 117, access the database within the service platform 103, or a combination thereof.

The filter modification module 203 enables the administrator to create rules that will determine which content items of the services 109a-109n would appear in the available landing spots on the landing page presented on a UE 101. The rules are created by selecting, for example, the category of the service item, the price or the price range of the service item, and a tie-breaker to determine which service item should be selected in cases where there are several service items from the same category and with the same price, or within the same price range. Several different factors or criteria (e.g., content criteria) may be used as tie-breakers such as most popular service, most popular service in the past 24 hours, most recently used service or a combination thereof.

In one embodiment, a recommendation from a friend (e.g., sent via the friend's UE), or from any other trusted entity may be used as a tie-breaker by itself or in combination with other tie-breakers mentioned above.

In another embodiment, a promotion by the service producer may be used as a tie-breaker. For example, if two music download services have similar levels of popularity, both were used recently and both offer the same prices, but one of them offers a free download for every five paid downloads, this offer may break the tie to the benefit of the promotion offering producer.

As another example, if the administrator chooses "game" as category, "action" as subcategory, "zero" as the price and "most popular" as a tie-breaker, the service item selected will be a free and most popular action game. The popularity may be defined based on number of downloads and the service needs to be selected from among the list of services that have not been selected for the same landing page in order to avoid repeated service on the same page.

If the same combination of rules and tie-breakers is applied for more than one landing spot on the same landing page, the first spot will have the most popular, free action game; the second spot will have the second most popular, free, action game and so on.

In one embodiment, the filter modification module 203 may store the filter (the rule combination) in the modified rules database 213 or in a temporary storage space (not shown) and send a link to the filter to the filtering module 207.

Following the selection of rules for the available spots on the landing page for a UE 101 or a group of UEs 101, the administrator may want to view the potential appearance of the landing page based on the new selections. For this purpose, in one embodiment, the administrator may activate the service aggregation module 209 to provide a preview panel for the administrator to preview the landing page and make necessary updates. The service aggregation module 209 may request the filtering module 207 to apply the set of filters produced by the filter modification module 203 on the rules and produce the final set of rules for the specific group of UEs. The service aggregation module 209 may generate a preview panel of a landing page by applying the filtered rules on the list of services and display the landing page on administrator's monitor.

Furthermore, the administrator may request to see various possible landing pages in an easy and user friendly way to be able to compare and evaluate them. In one embodiment, a preview panel provided by the service aggregation module 209 may allow the administrator to, for example, select the country and the type of UE 101 and to see, by refreshing the preview, what service items will appear on the landing page for those selections. As a result, the administrator will be able to quickly check what the landing page will look like in key markets and apply further filter modifications if necessary. The preview panels may be temporarily stored.

In one embodiment, if the administrator does not approve the settings, the temporarily stored preview panel may be lost and not accessible in the future. In such case, the filters may be automatically reset to the last saved set of rules. Once the administrator is satisfied with the rule settings and approves the modified filters, the filter modification module 203 can store the approved filters (rule combination) in the modified rules database 213 and send a message to the filtering module 207 stating that the final filter is ready to be applied on the available services.

The service aggregation module 209 provides the structure of the related landing page by alerting the filtering module 207 to apply the final set of rules on the list of available services. The filtering module 207 may fetch the modified filters from the modified rules database 213, apply them on the list of services and create the final applicable set of services. The service aggregation module 209 may then generate the landing page structure for one or more UEs 101, and activate the presentation module 211 to present the landing page to the related UEs 101. The online store application 107 of the UE 101 receives the landing page structure, builds the landing page accordingly, and displays the page on the UE's monitor display.

In one embodiment, the manual entry module 205 enables the administrator to manually manipulate the rules. In this embodiment the administrator is allowed to promote one or more content or service items locally for any given spots on the landing page, for example, for a given country and UE. The administrator may do so by accessing the list content items from the services 109 on the service platform 103 via the communication network 105. In one embodiment, the content items may have ID numbers assigned to them and the administrator may be able to search and access a content item using its ID number. Following the selection of a content item, the manual entry module 205 enables the administrator to identify which spot on the landing page is being assigned to the selected content item. In one embodiment, the manually selected content item may comprise, at least in part, an override rule that supersedes any other applicable automatic rule.

In one embodiment, the manual entry module 205 enables the administrator to also select the start and end dates for the time period the manually selected content item is desired to appear on the landing page. In another embodiment, the manual entry overrides the automatic rule that might be applicable to the landing spot occupied by the manually selected content item.

In yet another embodiment, the manual entry module 205 enables the administrator to promote one or more content or service items globally that is, for example, for all countries and all UEs 101. For example, if the administrator selects a content item for all countries and all UEs 101, the selected content item will appear on the landing pages of every supported device in every supported country.

Following the manual selection of content items for the available landing spots on the landing page, the administrator may want to view the potential appearance of the landing page based on the selections. For this purpose, in one embodiment, the manual entry module 205 may send a request to the service aggregation module 209 to provide a preview panel for the administrator to preview the landing page and make necessary updates. The manual entry module 205 may store the entered information (selections) in the modified rules database 213 or in a temporary storage space (not shown) and send a link to the selections to the service aggregation module 209.

Once the administrator is satisfied with the selections, the manual entry module 205 can store the entered information (selections of manual override rules) in the modified rules database 213 and send a message to the service aggregation module 209 stating that the selections are ready to be applied on the available content items of the services 109. However, if the administrator does not approve the entry, the temporarily stored preview panel may be lost and not accessible in the future. In such case, the filter may be automatically reset to the last saved set of rules.

Figure 2B:
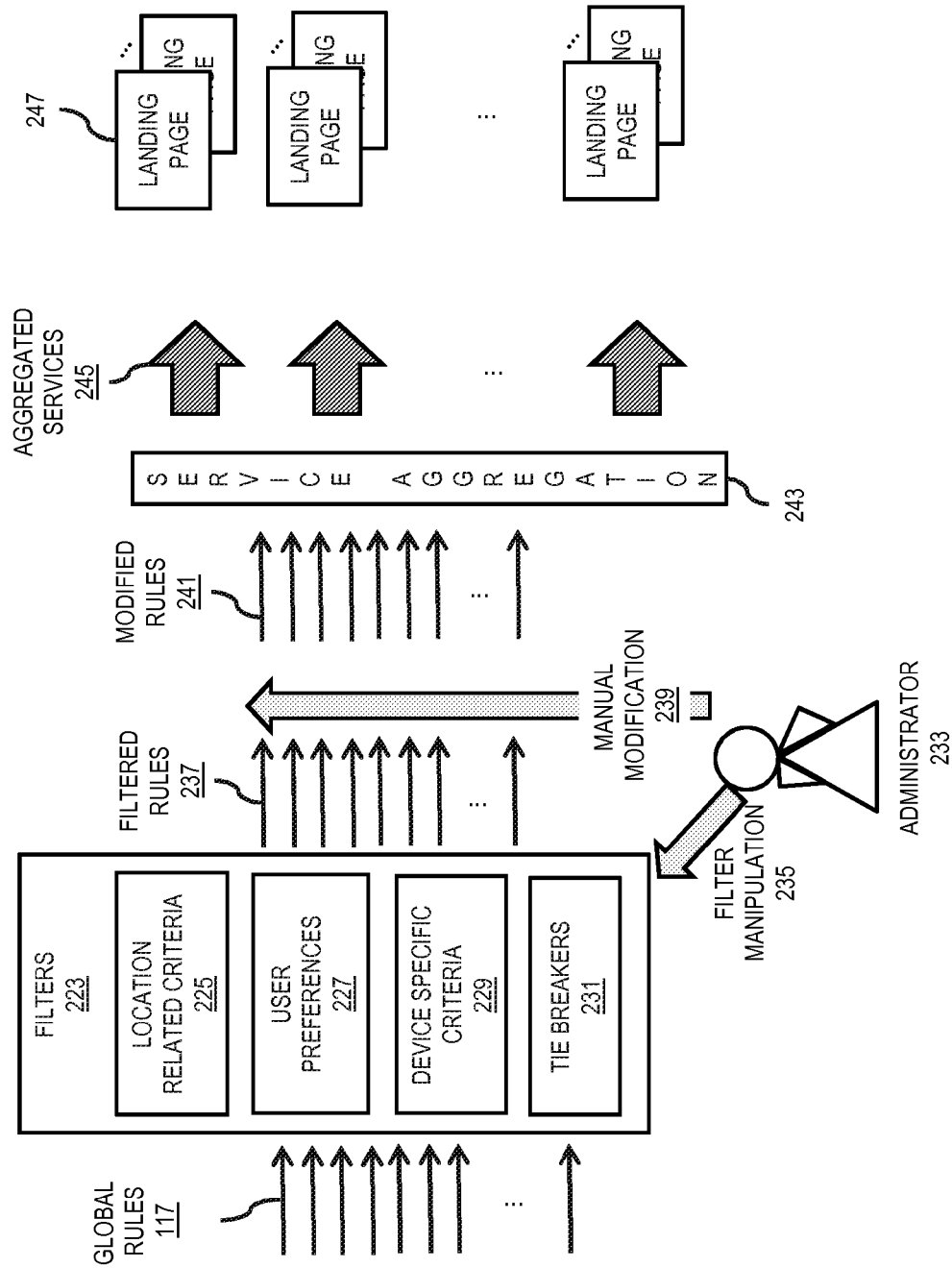
FIG. 2B is a diagram of the process of content programming platform, according to one embodiment.

FIG. 2B is a diagram of the process of content programming platform, according to one embodiment. In FIG. 2B, it is assumed that a set of global rules 117 have been predefined by the service providers, manufacturers, etc. and is presented to the administrator via service platform interface module 201 from the global rules database 117.

A set of filters 223 are provided by administrator 233 through filter manipulation process 235. The filters 223 or rules may be based on location 225, user preferences 227 and device specification 229. User preferences may take into consideration the recent user behavior such as recently accessed services, service categories such as games, video, audio, etc., service price range and so on. Furthermore, a set of tie-breaker filters 231 is also provided for breaking tie between rules with equivalent impact. For example, some content may be available only for a certain country or unavailable for a certain country for licensing reasons. A location related criteria may impose a condition on rule selection to exclude locations that the content cannot be provided to. User preferences 227 may also include user interests. For example, a user may desire to receive only game category contents and not any other group of contents. Device specific criteria 229 exclude contents that a certain group of UEs 101 may not be able to handle. For example for lack of enough memory, not enough processing power, etc. Tie-breakers 231 are rules that are applied to break a tie between more than one content items assigned to a certain landing spot on the landing page. The tie-breaking may be based on service popularity, service fees, recommendations, service promotions, etc. Furthermore the administrator 233 may manually impose filters 239 (e.g., override rules) via the manual entry module 205. The manually entered filters or override rules will override filters 223 that are, for instance, used to automatically determine content item for the corresponding landing spot. The administrator 233 may also preview the landing pages before approving the set of filters, via the filtering module 207 and the service aggregation module 209. Following the application of filters on the rules, the modified set or rules 241 is generated. The service aggregation 243, comprises application of the modified rules 241 on the list of available services and creating aggregated sets 245 of services by the filtering module 207 and aggregating all the services for one landing page by the service aggregation module 209, where each group of aggregated services is tailored for a group of one or more UEs 101, for example, UEs 101 that are licensed to receive certain services, UEs 101 that have processing power to execute certain applications, UEs 101 that are in a country C, or any combination of these groups of UEs 101. The aggregated service or content items 245 are then presented to the UEs 101 via the presentation module 211. The results will appear on the landing pages 247.

Figure 3:
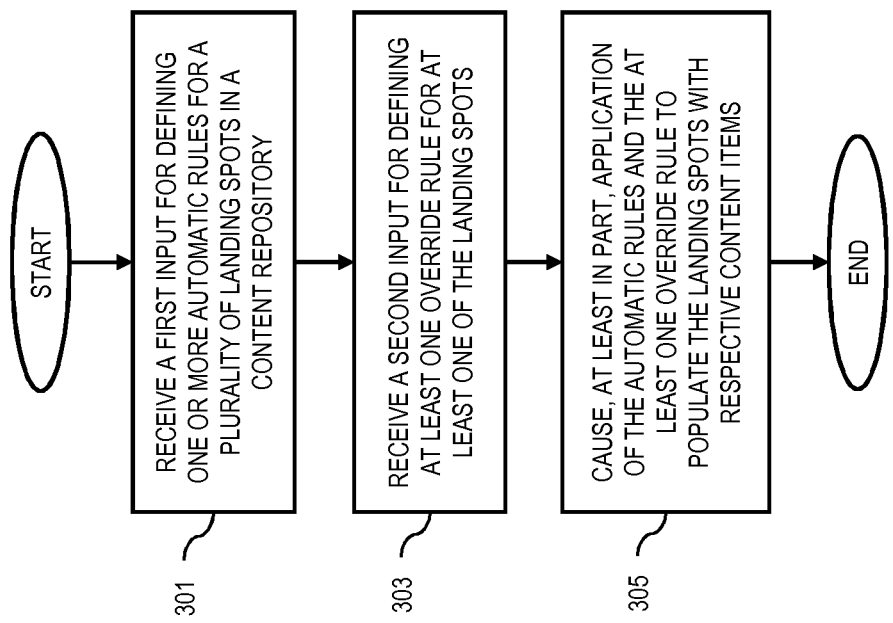
FIG. 3 is a flowchart of a process for populating a landing page, according to one embodiment.
Figure 8:
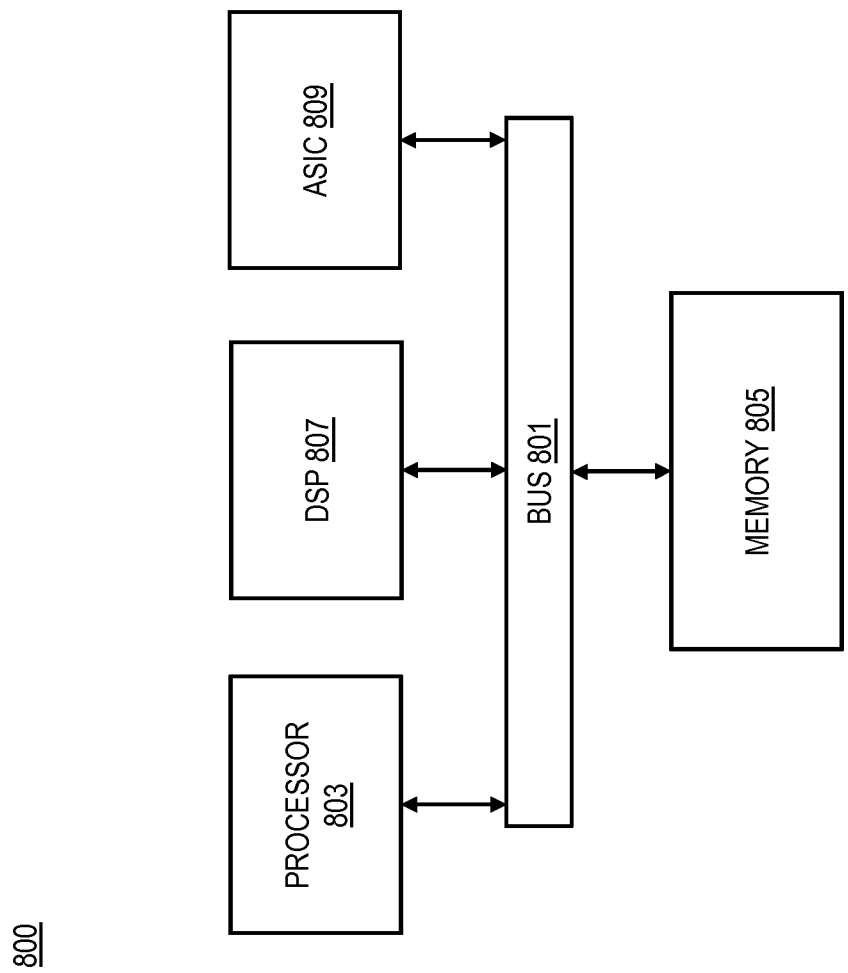
FIG. 8 is a diagram of a chip set that can be used to implement an embodiment of the invention.

FIG. 3 is a flowchart of a process for populating a landing page, according to one embodiment. In one embodiment, the content programming platform 111 performs the process 300 and is implemented in, for instance, a chip set including a processor and a memory as shown in FIG. 8. In step 301, the content programming platform 111 receives an input for automatic rule definition. This step which is equivalent of step 235 can be triggered by the administrator. The input may include content criteria for specifying the content items such as criteria that select items that are location related, user defined, device specific or any combinations thereof. The input may also include tie-breakers, as discussed above. In step 303, the content programming platform 111 receives manual entry of an override rule (e.g., a rule for altering the content item of a landing spot determined by an automatic rule) by the administrator as seen in step 239. The manual entries override the previously entered input or rule. In step 305, the content programming platform 111 causes the set of rules (e.g., both the automatic rules and the superseding override rules) to populate the landing pages 247.

Figure 4:
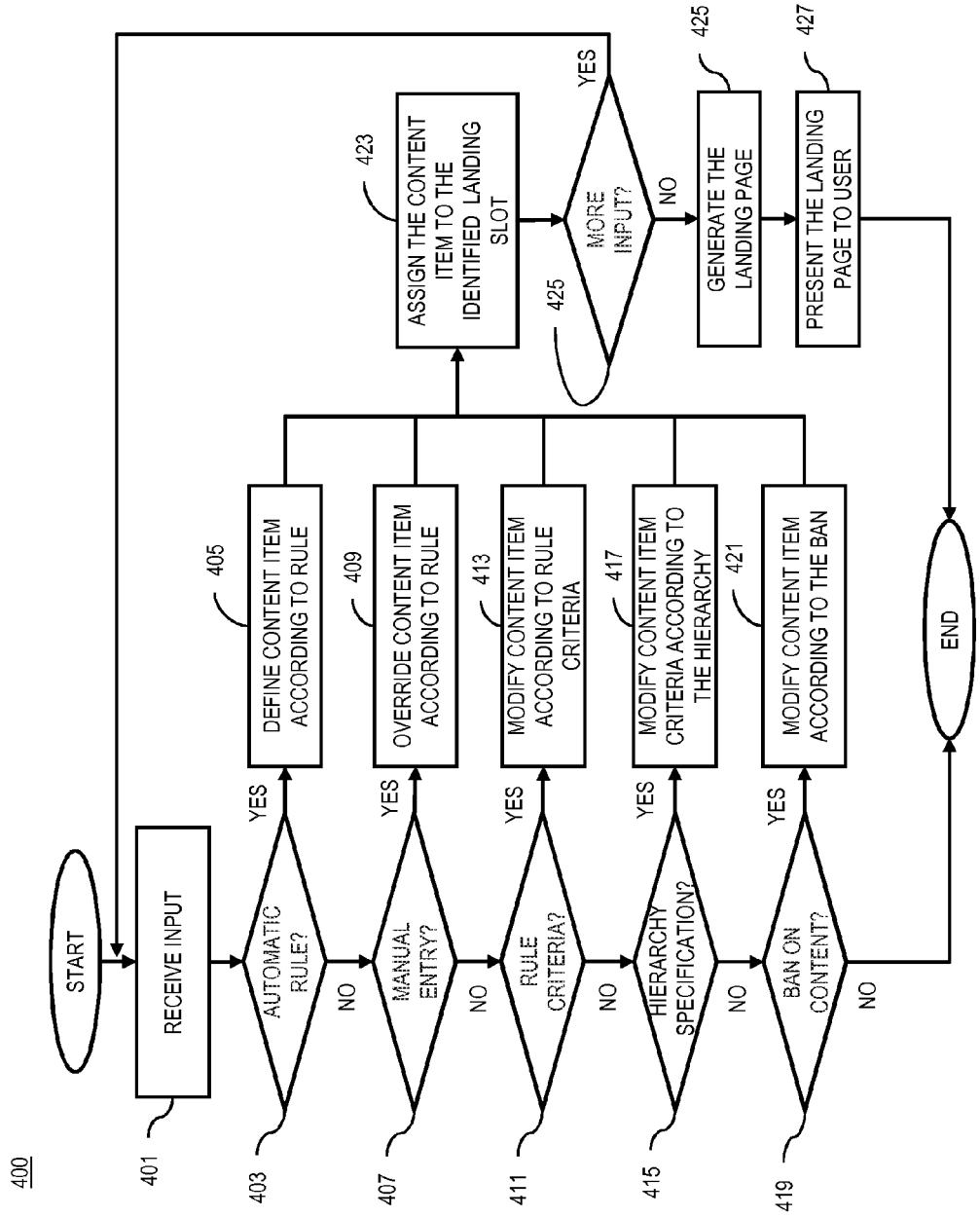
FIG. 4 is a flowchart of a process for providing a hybrid approach for rule setting by online service providers, according to one embodiment.

FIG. 4 is a flowchart of a process for providing a hybrid approach for rule setting by online service providers, according to one embodiment. In step 401, the content programming platform 111 receives an input from the administrator, through the service platform interface module 201. The input may identify a combination of rules for filtering the list of available content items of the services 109 in order to present a particular content item in a certain landing spot on the landing page. In step 403, the content programming platform 111 checks whether the received input is an automatic rule. An automatic rule may comprise one or more components such as service or content type (game, finance, video, audio, etc.), service price, tie-breaker, etc. for automatically determined a content item for a specified landing spot.

In one embodiment, if the input is an automatic rule, per step 405, the filter modification module 203 combines the input components into a unified rule and inserts the rule in the modified rules database 213. This rule is then applied to the list of services by the filtering module 207 and as a result the content item that satisfies the rule is selected.

In another embodiment, if the input is not an automatic rule, per step 407 the content programming platform 111 checks whether the received input is a manual input or an override rule. If the input is a manual entry by the administrator defining a condition or a combination of conditions for selecting a service for a spot on the landing page, per step 409 the filter modification module 203 inserts the override rule in the modified rules database 213. This rule will override any other rule (e.g., an automatic rule or previously entered override rule) that has already been assigned to the specific spot. The override rule is then applied to the list of services by the filtering module 207 and as a result the content item that satisfies the rule is selected.

In yet another embodiment, if the input is not a manual entry, per step 411 the content programming platform 111 checks whether the received input is a rule criterion for an already defined rule. A rule criterion may be, for instance, a country, territory, a device type or any other restrictions that are required to be imposed on a specific set of rules. In other words, rule criteria determine how rules are to be applied on the landing pages of the online store based on the criteria. If the input is a rule criterion defining a condition or a combination of conditions for selecting a service for a spot on the landing page, per step 413, the filter modification module 203 applies the rule criterion on the related rule in the modified rules database 213. The new modified rule is then applied to the list of services by the filtering module 207 and as a result the content item that satisfies the modified rule is selected.

In yet another embodiment, if the input is not a rule criterion, per step 415 the content programming platform 111 checks whether the received input is a hierarchy specification for an already defined rule. A hierarchy may change the order in which the criterion is applied on the content. For example whether the list of services should be first filtered according to the country and secondly according to the device type or the other way around. If the input is a hierarchy definition, per step 417 the filter modification module 203 applies the hierarchy on the related rule in the modified rules database 213. The new modified rule is then applied to the list of services by the filtering module 207 and as a result the content item that satisfies the modified rule is selected.

In yet another embodiment, if the input is not a hierarchy specification, per step 419 the content programming platform 111 checks whether the received input is a ban on one or more contents or content types. A ban may remove one or more services that have already been selected to appear on the landing page. For example the ban may remove restricted rated games from appearing on certain UEs 101 based on user request. If the input is a ban on content, per step 421, the filter modification module 203 applies the ban on the related rule in the modified rules database 213. The new modified rule is then applied to the list of content or service items by the filtering module 207, and as a result, the content item that satisfies the modified rule is selected.

In step 423, the service aggregation module 209 assigns the content item of any of steps 405, 409, 413, 417, or 425 to the determined spot on the landing page. As long as more input exists, the process of steps 401 to 423 will repeat. For example, if the landing page consists of 30 spots and the administrator is willing to assign content items and/or rules to all 30 spots the loop will repeat 30 times until services are assigned to all 30 spots. Alternatively, in one embodiment, if the administrator assigns services to 10 spots, the remaining 20 spots will present any content items that have already been assigned or determined for the respective spots. The landing spots that have no content items or rules assigned to them may remain blank. In that case, the administrator may manually shift the assigned services to the top of the list so that they appear on consecutive spots, avoiding blank spots in between.

In certain embodiments, the automatic rule, the override rule, or a combination thereof may specify a range of content items rather and an individual. For example, a rule may specify that a particular landing spot may present one content item among the top 10 most popular content items. In this situation, the service aggregation module 209 can randomly select a content item from among the range of content items defined for the spot. In this way, the service aggregation module 209 can advantageously vary the content items presented in a page to ensure that the landing page appears dynamic and changing. Because overall popularity of items may not change that often over time, this approach for dynamically changing the display can, for instance, reduce the potential that a user will become bored of the landing page after repeated viewings because different items would be presented in the landing page.

Following the process of the last input, per step 425, the service aggregation module 209 generates the landing page using the assignments of step 423. In step 427, the presentation module 211 presents the landing page on the UE 101's display. In one embodiment, the generated landing page may be stored in the local storage space of the UE 101 (not shown), in the information space 113, or in any storage having connectivity to the UE 101 via the communication network 105.

Figure 5A:
FIGS. 5A-5B are diagrams of a user interface for automatic rule definition, according to one embodiment.
Figure 5B:
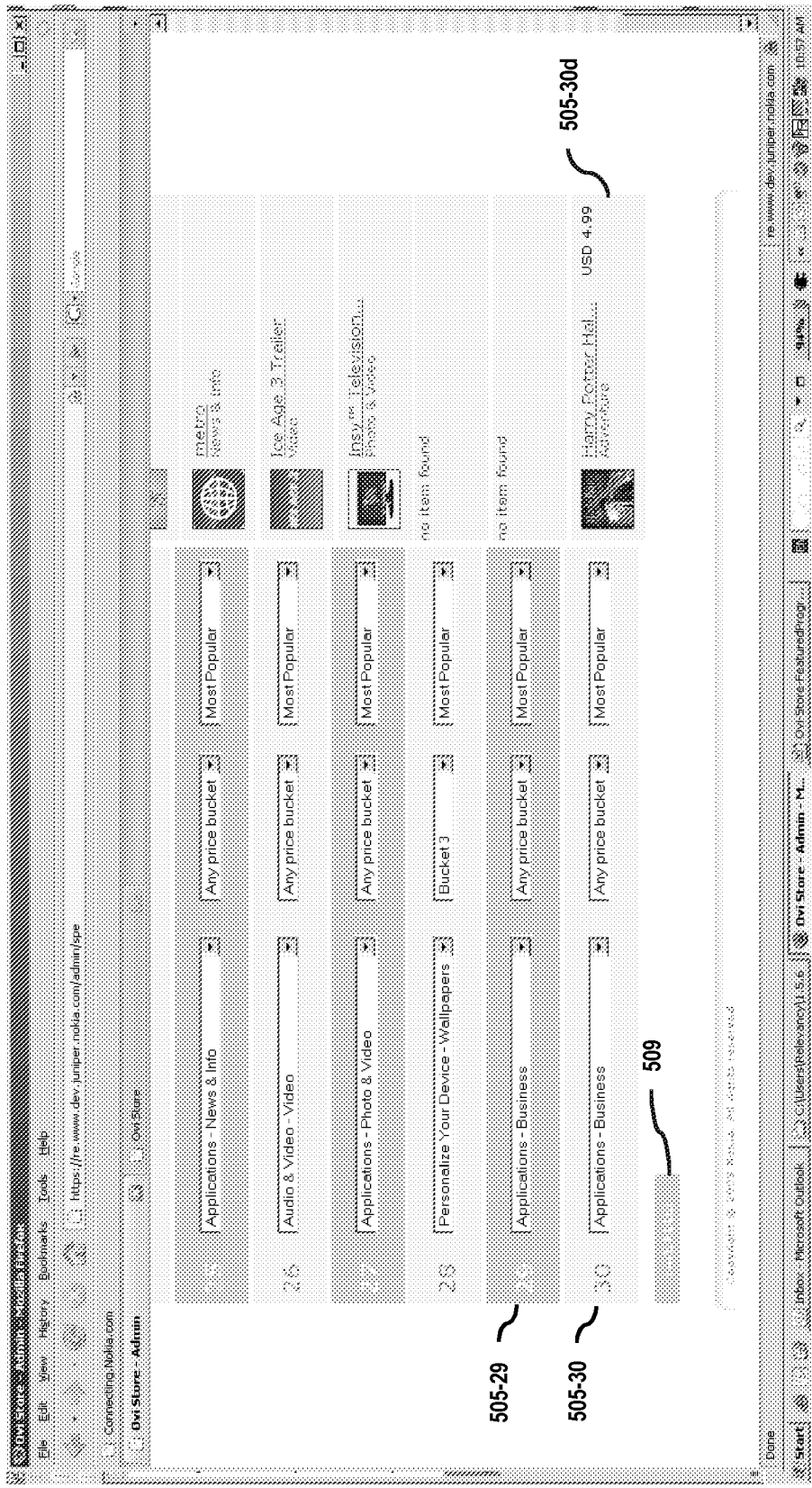

FIGS. 5A-5B are diagrams of a user interface for automatic rule definition, according to one embodiment. FIG. 5A is an exemplary interface for automatic filter or modification. The lines 505-1 to 505-30 (in FIG. 5B) represent setup lines for available landing spots on the landing page. In this embodiment, there are 30 slots to be programmed. Each of the lines 505-1 to 505-30 contains components 505-1a to 505-1c where 505-1a is a dropdown menu for selecting the desired type of content item to appear in the slot. Some exemplary service categories could be application, game, audio and video, etc. Within each category, subcategories may exist. For example, applications may contain news and information related applications, business related applications, media related applications such as photo editors, sports related applications, etc. The dropdown menu 505-1b enables the administrator to select the desired price range of the content items to appear in the specific slot. The values for the price may include "zero" for free services, "any" if there are no price restrictions to be applied or any predetermined range. As seen in FIG. 5A, the predefined price ranges are referred to as price buckets where each bucket represents a certain range (for example bucket 0 for free services). The dropdown menu 505-1c enables the administrator to select a tie-breaker for cases where more than one content or service item satisfies the criteria 501 and 503 and conditions setup in 505-1a and 505-1b. A tie-breaker may be popularity of each of the content items, meaning that the most popular service from the services satisfying all conditions is selected. Other tie-breakers could be service fees (e.g. select the lowest price from the services satisfying the conditions); recommendations (select a service recommended by a friend from the services satisfying the conditions, service promotions (select a service that offers a special promotion from services satisfying the conditions), etc.

The block 505-1d to 505-30d represents a preview of selected service items to appear on the slot in landing page of the UEs 101. Following the selection of desired conditions, the administrator can click on button 507 to preview the service that will appear in each slot. The menu item 501 and 503 enable the administrator to select the criteria for preview before clicking on button 507. The dropdown menu item 501 contains country and territory names enabling the administrator to select the location. The drop down menu 503 contains device types allowing the administrator to select desired type of the UE 101. Following the administrator clicking on button 507, the filtering module 207 is activated. The filtering module 207 applies the selected filters on the list of available services for the selected country and device. The filtering result is passed from the filtering module 207 to the service aggregation module 209 and the service aggregation module 209 generates the preview. The preview results are temporarily saved and presented on 505-1d locations via the presentation module 211. The administrator can continue modifying the filters and refresh the preview 507 after each modification until satisfactory results are achieved. When the preview is satisfactory, the administrator can click on button 509 to permanently save the new filters. In case the administrator navigates away from the editor by closing the window, the latest changes may be lost and the latest permanently stored set of filters remain active.

Figure 6A:
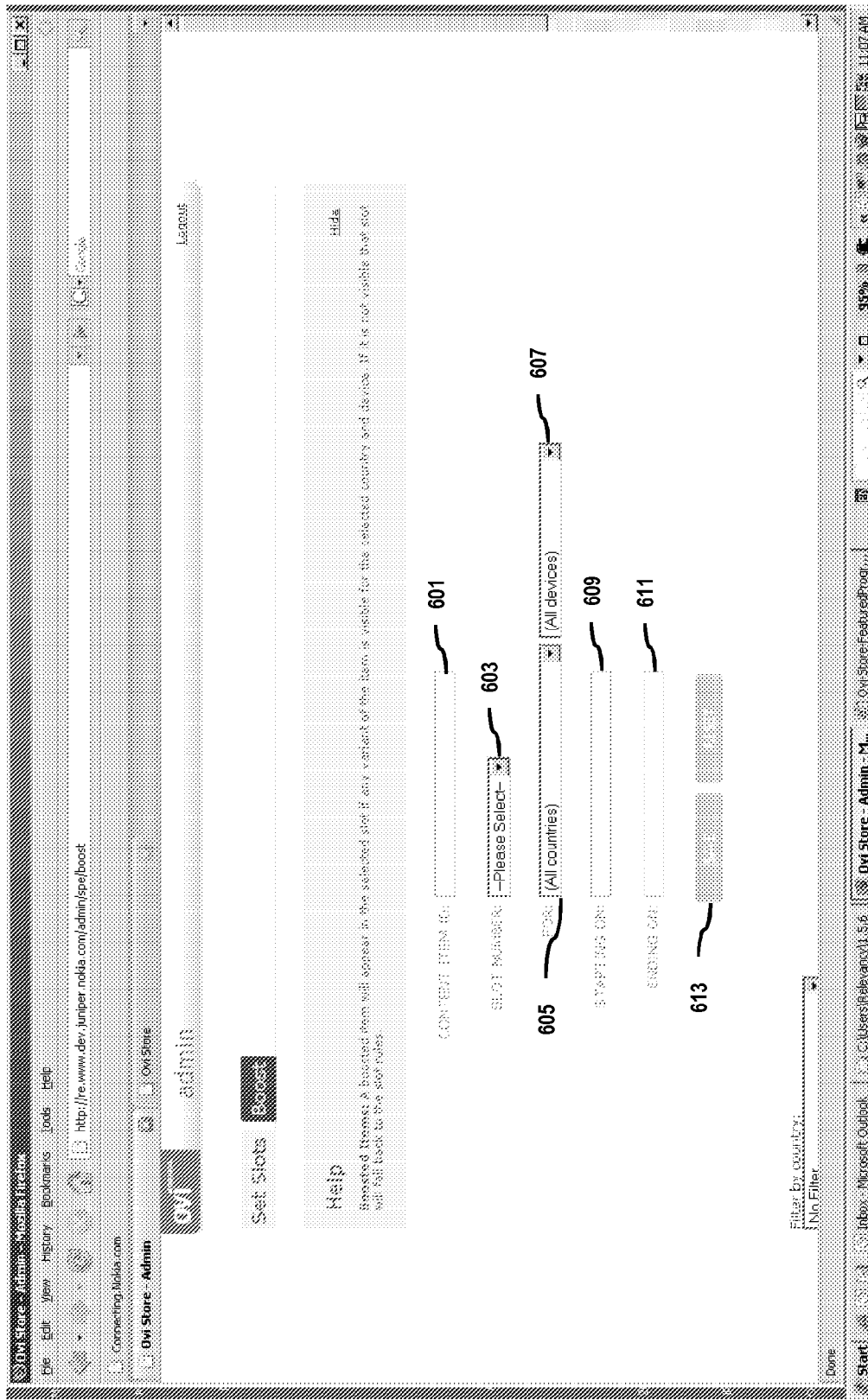
FIGS. 6A-6B are diagrams of a user interface for override rule definition, according to one embodiment.
Figure 6B:

FIGS. 6A-6B are diagrams of a user interface for override rule definition, according to one embodiment. In this embodiment, the selected options 505a to 505c for slots 1 to 30 in FIGS. 5A and 5B are applied on all countries and all devices. In cases where the administrator needs to fine tune the services for certain countries or devices, the overriding rules can be manually entered as seen in FIGS. 6A and 6B.

Location 601 in FIG. 6A enables the administrator to select a certain service or content that is desired to be enforced on the landing page. For example, a certain game may need to be promoted for duration of 5 days. The administrator enters the game ID in location 601. In location 603, the administrator identifies on what slot of the landing page the game should appear. In step 605, the administrator selects the criteria including the country or device type that the game will appear on. The options "all countries" and "all devices" will make the game appear on all devices regardless of their type and their location. In locations 609 and 611, the administrator inserts the agreed period of time that the game will appear on the specified slot. By pressing the save button 613 the manually entered override rules are saved by the manual entry module 205. The new rule will override any previously selected service that would have appeared on the selected slot.

As seen in FIG. 6B, once a manual entry (boost) is saved, it will appear lower on the page under either the "Active boost" 623 section or the "Upcoming boosts" 625 section. At that point, the administrator can choose to edit or remove the manually entered filters if the result is not satisfactory and need to be changed.

Following saving of a manual entry or an override rule, the rule will be automatically active in production. The administrator can check to see the appearance of the landing page with the new changes by going back to the screen of FIGS. 5A and 5B and click on button 507 to refresh the preview list 505-1d to 505-30d. If country 501 and device 503 are selected in the preview section to be the same as the country 605 and device 607 of the override rule page 6A and 6B, the administrator will see the manually entered item in the desired slot and the background will be green to denote that the item is there as a result of an override rule and not the result of the rule previously set for that slot. If the administrator selects a different country 501 and device 503 for the preview, the manually entered service item will not appear in the preview list. This can assure the administrator, as a test, that the manual entry is working correctly.

The processes described herein for providing a providing a hybrid approach for rule setting by online service providers may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
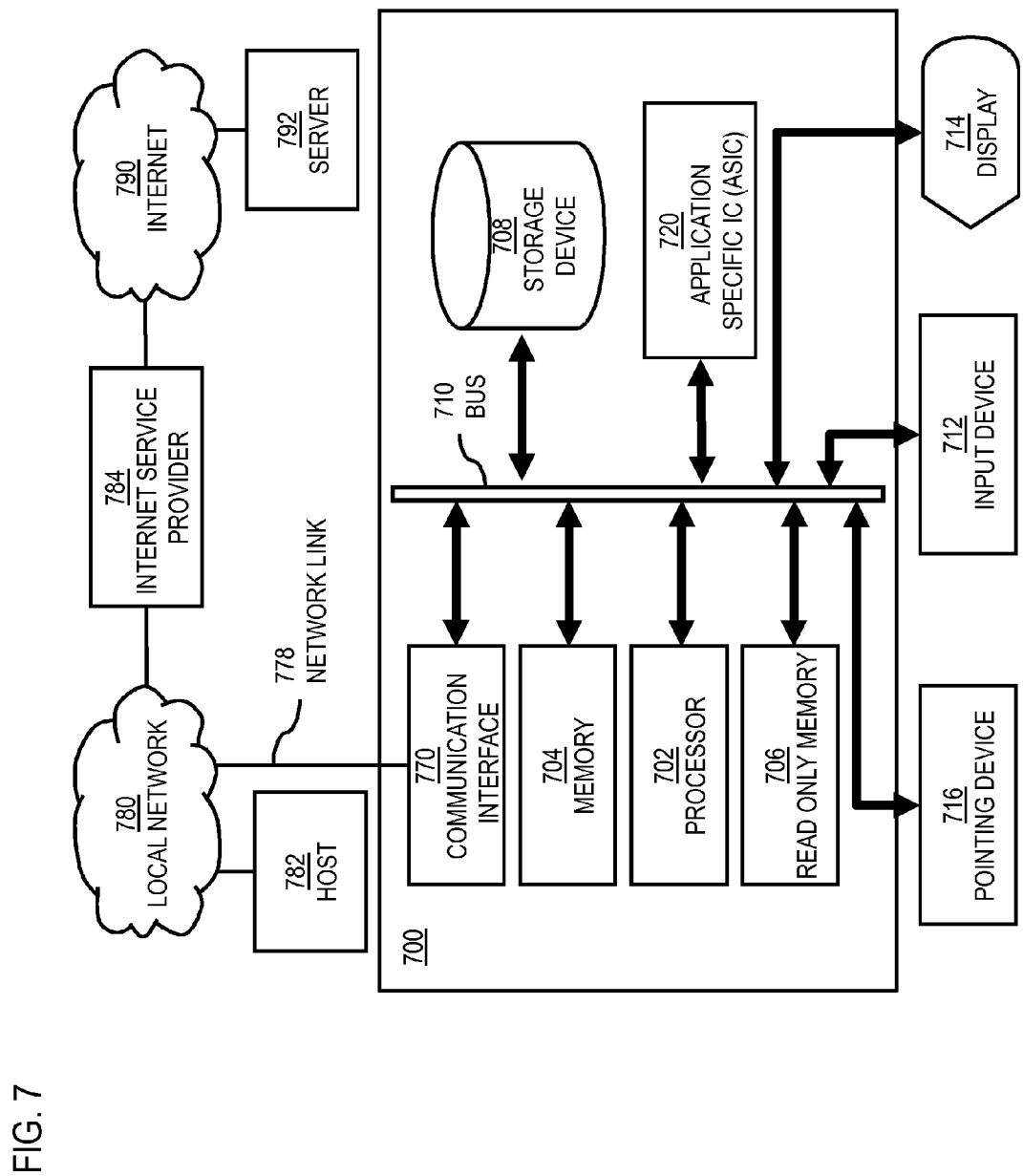
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide a hybrid approach for rule setting by online service providers as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing a hybrid approach for rule setting by online service providers.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to provide a hybrid approach for rule setting by online service providers. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for providing a hybrid approach for rule setting by online service providers. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing a hybrid approach for rule setting by online service providers, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing a landing page tailored to the specific characteristics related to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to provide a hybrid approach for rule setting by online service providers as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of services. Chip set or chip 800, or a portion thereof, constitutes a means for performing one or more steps of providing a hybrid approach for rule setting by online service providers.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide a hybrid approach for rule setting by online service providers. The memory 805 also stores the data associated with or generated by the execution of the inventive steps.

Figure 9:
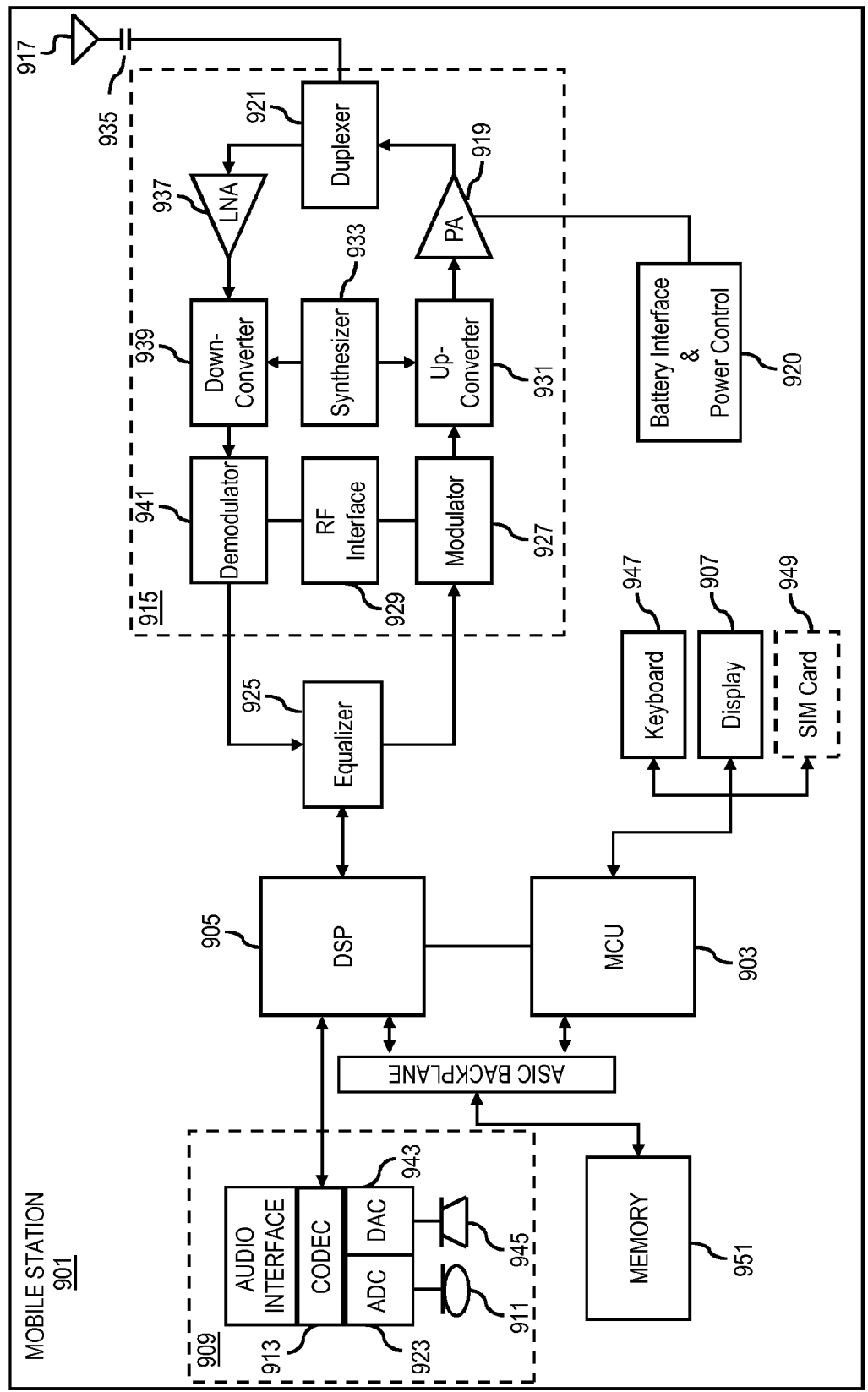
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 900, or a portion thereof, constitutes a means for performing one or more steps of providing a hybrid approach for rule setting by online service providers. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their)

accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing a hybrid approach for rule setting by online service providers. The display 9 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide a hybrid approach for rule setting by online service providers. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method executable on a hardware computer having at least one non-transitory memory including computer program code, the method comprising:
   receiving, by receiving circuitry, a first input for defining one or more automatic rules for a plurality of landing spots in a content repository, the automatic rules, readable from non-transitory computer-readable storage medium, and defining one or more content items for presentation in the respective landing spot;
   receiving, by the receiving circuitry, a second input for defining at least one override rule for at least one of the landing spots, the at least one override rule superseding the automatic rule corresponding to the at least one landing spot;
   using one or more processors, causing, at least in part, application of the automatic rules and the at least one override rule to provide an administrative preview panel to display at least one preview landing page; and
   using the one or more processors, causing, at least in part, application of the automatic rules and the at least one override rule to populate the landing spots with respective content items.

2. A method of claim 1, further comprising:
   receiving, by the receiving circuitry, a third input for specifying a hierarchy of content item criteria,
   wherein the automatic rules, the at least one override rule, or a combination thereof define the one or more content items for presentation in the respective landing spot based, at least in part, on the hierarchy.

3. A method of claim 2, wherein the content item criteria include content category, price, popularity, date, or a combination thereof.

4. A method of claim 1, further comprising:
   receiving, by the receiving circuitry, a third input for specifying one or more rule criteria, the rule criteria specifying, at least in part, how the automatic rules, the at least one override rule, or a combination thereof are applied with respect to at least one of a country associated with the content items, a device associated with content items, an operator associated with the content items, a content provider associated with the content items, or a combination thereof,
   wherein the application of the automatic rules and the at least one override rule is based, at least in part, on the rule criteria.

5. A method of claim 1, wherein the automatic rules, the at least one override rule, or a combination thereof specify a plurality of content items for at least another one of the landing spots, the method further comprising:
   receiving, by the receiving circuitry, tie-breaker criteria to define the one or more content items for the at least one of the landing spots when the automatic rules, the at least one override rule, or a combination thereof specify a tie between one or more content items.

6. A method of claim 1, further comprising:
   receiving, by the receiving circuitry, a third input for specifying a ban on one or more of the content items,
   wherein the ban supersedes the application of the automatic rules and the at least one override rule.

7. A method of claim 1, wherein the automatic rules, the at least one override rule, or a combination thereof are specified on a global basis, a local basis, or a combination thereof, and wherein the rules specified on the local basis supersede the rules specified on the global basis.

8. A method of claim 1, wherein the content repository is organized by collections, and wherein the automatic rules, the at least one override rule, or a combination thereof are defined according to the collections; and wherein the hardware computer further includes a digital signal processing chip, an application specific integrated circuit, or a field programmable gate array.

9. A method of claim 1, further comprising processing one or more updates to the at least one administrative preview landing page before the population of the landing spots.

10. An apparatus comprising:
    at least one processor; and
    at least one memory including computer program code,
    the at least one memory and the computer program code configured to, with the at least one processor, cause the apparatus to perform at least the following,
    receive, by receiving circuitry, a first input for defining one or more automatic rules for a plurality of landing spots in a content repository, the automatic rules defining one or more content items for presentation in the respective landing spot;
    receive, by the receiving circuitry, a second input for defining at least one override rule for at least one of the landing spots, the at least one override rule superseding the automatic rule corresponding to the at least one landing spot;
    cause, at least in part, application of the automatic rules and the at least one override rule to provide an administrative preview panel to display at least one preview landing page; and
    cause, at least in part, application of the automatic rules and the at least one override rule to populate the landing spots with respective content items.

11. An apparatus of claim 10, wherein the apparatus is further caused to:
    receive, by the receiving circuitry, a third input for specifying a hierarchy of content item criteria,
    wherein the automatic rules, the at least one override rule, or a combination thereof define the one or more content items for presentation in the respective landing spot based, at least in part, on the hierarchy.

12. An apparatus of claim 11, wherein the content item criteria include content category, price, popularity, date, or a combination thereof.

13. An apparatus of claim 10, wherein the apparatus is further caused to:
    receive, by the receiving circuitry, a third input for specifying one or more rule criteria, the rule criteria specifying, at least in part, how the automatic rules, the at least one override rule, or a combination thereof are applied with respect to at least one of a country associated with the content items, a device associated with content items, an operator associated with the content items, a content provider associated with the content items, or a combination thereof,
    wherein the application of the automatic rules and the at least one override rule is based, at least in part, on the rule criteria.

14. An apparatus of claim 10, wherein the automatic rules, the at least one override rule, or a combination thereof specify a plurality of content items for at least another one of the landing spots, and wherein the apparatus is further caused to:
    receive, by the receiving circuitry, tie-breaker criteria to define the one or more content items for the at least one of the landing spots when the automatic rules, the at least one override rule, or a combination thereof specify a tie between one or more content items.

15. An apparatus of claim 10, wherein the apparatus is further caused to:
receive, by the receiving circuitry, a third input for specifying a ban on one or more of the content items,
wherein the ban supersedes the application of the automatic rules and the at least one override rule.

16. An apparatus of claim 10, wherein the automatic rules, the at least one override rule, or a combination thereof are specified on a global basis, a local basis, or a combination thereof, and wherein the rules specified on the local basis supersede the rules specified on the global basis.

17. An apparatus of claim 10, wherein the content repository is organized by collections, and wherein the automatic rules, the at least one override rule, or a combination thereof are defined according to the collections; and wherein the apparatus further includes a digital signal processing chip, an application specific integrated circuit, or a field programmable gate array.

18. An apparatus of claim 10, wherein the apparatus is further caused to process one or more updates to the at least one administrative preview landing page before the population of the landing spots.

19. A non-transitory computer-readable storage medium carrying one or more sequences of one or more instructions which, when executed by one or more processors, cause an apparatus to at least perform the following steps:
receiving, by receiving circuitry, a first input for defining one or more automatic rules for a plurality of landing spots in a content repository, the automatic rules defining one or more content items for presentation in the respective landing spot;
receiving, by the receiving circuitry, a second input for defining at least one override rule for at least one of the landing spots, the at least one override rule superseding the automatic rule corresponding to the at least one landing spot;
causing, at least in part, application of the automatic rules and the at least one override rule to provide an administrative preview panel to display at least one preview landing page; and
causing, at least in part, application of the automatic rules and the at least one override rule to populate the landing spots with respective content items.

20. A non-transitory computer-readable storage medium of claim 19, wherein the apparatus is caused to further perform:
receiving, by the receiving circuitry, a third input for specifying one or more rule criteria, the rule criteria specifying, at least in part, how the automatic rules, the at least one override rule, or a combination thereof are applied with respect to at least one of a country associated with the content items, a device associated with content items, an operator associated with the content items, a content provider associated with the content items, or a combination thereof,
wherein the application of the automatic rules and the at least one override rule is based, at least in part, on the rule criteria.

21. A non-transitory computer-readable storage medium of claim 19, wherein the automatic rules, the at least one override rule, or a combination thereof specify a plurality of content items for at least another one of the landing spots, and wherein the apparatus is caused to further perform:
receiving, by the receiving circuitry, tie-breaker criteria to define the one or more content items for the at least one of the landing spots when the automatic rules, the at least one override rule, or a combination thereof specify a tie between one or more content items.

22. A non-transitory computer-readable storage medium of claim 19, wherein the apparatus is caused to further perform:
receiving, by the receiving circuitry, a third input for specifying a hierarchy of content item criteria,
wherein the automatic rules, the at least one override rule, or a combination thereof define the one or more content items for presentation in the respective landing spot based, at least in part, on the hierarchy; and
wherein the one or more sequences of one or more instructions may be executed by a digital signal processing chip, an application specific integrated circuit, or a field programmable gate array.

23. A non-transitory computer-readable storage medium of claim 19, wherein the apparatus is caused to further perform: processing one or more updates to the at least one administrative preview landing page before the population of the landing spots.

* * * * *